US006963837B1

(12) United States Patent
Finke et al.

(10) Patent No.: US 6,963,837 B1
(45) Date of Patent: Nov. 8, 2005

(54) ATTRIBUTE-BASED WORD MODELING

(75) Inventors: Michael Finke, Pittsburgh, PA (US); Jurgen Fritsch, Karlsruhe (DE); Detleff Koll, Pittsburgh, PA (US); Alex Waibel, Pittsburgh, PA (US)

(73) Assignee: Multimodal Technologies, Inc., Pittsburgh, PA (US)

( * ) Notice: Subject to any disclaimer, the term of this patent is extended or adjusted under 35 U.S.C. 154(b) by 937 days.

(21) Appl. No.: 09/680,925

(22) Filed: Oct. 6, 2000

Related U.S. Application Data

(60) Provisional application No. 60/157,874, filed on Oct. 6, 1999.

(51) Int. Cl.[7] .............................................. G10L 15/14
(52) U.S. Cl. ........................ 704/256; 704/255; 704/240; 704/244; 704/257
(58) Field of Search ................................. 704/256, 255, 704/230, 240–244, 275, 270, 232, 245, 257, 270.1, 248

(56) References Cited

U.S. PATENT DOCUMENTS

| | | | | |
|---|---|---|---|---|
| 5,689,616 A | * | 11/1997 | Li | 704/232 |
| 5,745,649 A | * | 4/1998 | Lubensky | 704/232 |
| 5,758,023 A | * | 5/1998 | Bordeaux | 704/232 |
| 5,805,772 A | * | 9/1998 | Chou et al. | 704/255 |
| 5,870,709 A | * | 2/1999 | Bernstein | 704/275 |
| 5,940,794 A | * | 8/1999 | Abe | 704/253 |
| 5,983,180 A | * | 11/1999 | Robinson | 704/254 |
| 6,567,776 B1 | * | 5/2003 | Chang et al. | 704/236 |

OTHER PUBLICATIONS

Alleva, Fil, et al, "Improvements on the Pronunciation Prefix Tree Search Organization", ICASSP 1996, pp. 133–136.

Anastasakos, Anastasios, et al, "Duration Modeling in Large Vocabulary Speech Recognition", *International Conference on Acoustics, Speech and Signal Processing*, vol. 1, May 9, 1995, pp. 628–631.

Byrne, W., et al, "Pronunciation Modelling Using a Hand-Labelled Corpus for Conversational Speech Recognition", IEEE, vol. Conf. 23, May 12, 1998, pp. 313–316.

Delmonte, R., "Linguistic Tools for Speech Recognition and Understanding", *Database Inspec On Line*, Institute of Electrical Engineers, Stevenage, GB, Database accessin No. 4199465 XP002159657, abstract and Speech Recognition and Understanding Recent Advances, Trends and Applications, *Proceedings of the NATO Advanced Study Institute*, Cetraro, Italy, Jul. 1–13, 1990, pp. 481–485, Berlin, Germany, ISBN: 3–540–54032–6.

Erler, Kevin, et al, "HMM Representation of Quantized Articulatory Features for Recognition of Highly Confusible Words", *Proceedings of the International Conference on Acoustics, Speech and Signal Processing*, USA, NY, IEEE, vol. Conf. 17, Mar. 23, 1992, pp. 545–548.

(Continued)

*Primary Examiner*—Vijay Chawan
(74) *Attorney, Agent, or Firm*—Bromberg & Sunstein LLP; Robert Plotkin, PC

(57) ABSTRACT

An attribute-based speech recognition system is described. A speech pre-processor receives input speech and produces a sequence of acoustic observations representative of the input speech. A database of context-dependent acoustic models characterize a probability of a given sequence of sounds producing the sequence of acoustic observations. Each acoustic model includes phonetic attributes and suprasegmental non-phonetic attributes. A finite state language model characterizes a probability of a given sequence of words being spoken. A one-pass decoder compares the sequence of acoustic observations to the acoustic models and the language model, and outputs at least one word sequence representative of the input speech.

68 Claims, 4 Drawing Sheets

OTHER PUBLICATIONS

Finke, Michael, et al, "Flexible Transcription Alignment", *Proceedings. ASRU '97,* Santa Barbara, USA, Dec. 1997.

Finke, Michael, et al, "Speaking Mode Dependent Pronunciation Modeling In Large Vocabulary Conversational Speech Recognition", *Proceedings of Eurospeech–97,* Sep. 1997.

Fritsch, J., et al, "The Bucket Box Intersection (BBI) Algorithm for Fast Approximative Evaluation of Diagonal Mixture Gaussians", *IEEE International Conference on Acoustics, Speech and Signal Processing Conference Proceedings,* 1996, (Cat. No. 96CH35903), vol. 2, pp. 837–840.

Hwang, Jenq–Neng, et al, "Dynamic Frame–Skipping in Video Transcoding", *IEEE Second Workshop on Multimedia Signal Processing* (Cat. No. 98EX175), Dec. 7–9, 1998, pp. 616–621.

Koo, Myoung–Wan, et al, "A New Decoder Based on a Generalized Confidence Score", *International Conference on Acoustics, Speech and Signal Processing,* vol. 1, 1998.

Llorens, D., et al, "Acoustic and Syntactical Modeling in the Atros System", *IEEE, US,* Mar. 15–19, 1999, pp. 641–644.

Mergel, D., et al, "Construction of Language Models for Spoken Database Queries", *IEEE International Conference on Acoustics, Speech & Signal Processing,* vol. Conf. 12, Apr. 1, 1987, pp. 844–847.

Ney, H., et al, "Dynamic Programming Search for Continuous Speech Recognition", *IEEE Signal Processing Magazine,* Sep. 1999, vol. 16, No. 5, pp. 64–83.

Ney, H., et al, "Improvements in Beam Search for 10000–Word Continuous Speech Recognition", *IEEE,* Sep. 1992, pp. 9–12.

Ortmanns, Stefan, et al, "Look–Ahead Techniques for Fast Beam Search", *Proceedings of the ICASSP'97,* Munich, (Germany), 1997, pp. 1783–1786.

Ostendorf, M., et al, "Modeling Systematic Variations in Pronunciation via a Language–Dependent Hidden Speaking Mode", Proc. ICSLP, 1996, pp. 1–20.

Renals, S., et al, "Start–Synchronous Search for Large Vocabulary Continuous Speech Recognition", *IEEE Transactions on Speech and Audio Processing,* USA, Sep. 1999, vol. 7, No. 5, pp. 542–553.

Suaudeau, Nelly, et al, "An Efficient Combination of Acoustic and Supra–Segmental Informations in a Speech Recognition System", *ICASSP–94, IEEE International Conference on Acoustics, Speech and Signal Processing,* USA, vol. 1, Apr. 1994, pp. I/65–68.

Wagner, M., "Speaker Characteristics in Speech and Speaker Recognition", *Proceedings of IEEE Telcon '97, IEEE Region 10 Annual Conference, Speech and Image Technologies for Computing and Telecommunications,* vol. 2, , pp. 626, abstract.

Wang, H., et al., "Complete Recognition of Continuous Mandarin Speech for Chinese Language With Very Large Vocabulary but Limited Training Data", *Proceedings of the International Conference on Acoustics, Speech and Signal Processing (ICASSP), IEEE,* USA, May 9, 1995, pp. 61–64.

Finke, M., et al "Modeling and Efficient Decoding of Large Vocabulary Conversational Speech", *Eurospeech '99,* vol. 1, Sep. 5–9, 1999, pp. 467–470, XP002168070, Budapest, Hungary.

EPO International Search Report dated Jun. 29, 2001 for PCT/IB00/01539.

* cited by examiner

ATTRIBUTE-BASED WORD MODELING

This application claims priority from provisional application 60/157,874, entitled "Modeling and Efficient Decoding of Large Vocabulary Conversational Speech," which was filed Oct. 6, 1999, and which is incorporated herein by reference.

FIELD OF THE INVENTION

The invention relates to automatic speech recognition, and more particularly, to word models used in a speech recognition system.

BACKGROUND ART

Automatic speech recognition (ASR) systems do not effectively address variations in word pronunciation. Typically, ASR dictionaries contain few alternative pronunciations for each entry. In natural speech, however, words rarely follow their citation forms. This failure to capture an important source of variability can cause recognition errors, particularly in normal conversational speech.

The automatic inference of pronunciation variation has been explored using phonetically transcribed corpora. Unfortunately, increasing the number of dictionary entry variants based on a pronunciation model also increases the confusability between dictionary entries, and thus often leads to an actual performance decrease.

Speaking mode has been considered to reduce confusability by probabilistically weighting alternative pronunciations depending on the speaking style. See F. Alleva, X. Huang, M.-Y. Hwang, *Improvements on the Pronunciation Prefix Tree Search Organization*, Proc. Int. Conf. on Acoustics, Speech and Signal Processing, Atlanta, Ga., pp. 133–136, May 1996 (incorporated herein by reference). This approach uses pronunciation modeling and acoustic modeling based on a wide range of observables such as speaking rate; duration; and syllabic, syntactic, and semantic structure—contributing factors that are subsumed in the notion of speaking mode. See, e.g., M. Ostendorf, B. Byrne, M. Bacchiani, M. Finke, A. Gunawardana, K. Ross, S. Roweis, E. Shriberg, D. Talkin, A. Waibel, B. Wheatley, and T. Zeppenfeld, *Systematic Variations in Pronunciation via a Language-Dependent Hidden Speaking Mode*, in International Conference on Spoken Language Processing, Philadelphia, USA, 1996 (incorporated herein by reference).

Just as the phonetic representation of careful speech is a schematization of articulatory and acoustic events, a phonetic transcription of relaxed informal speech by its nature is a simplification. Pronunciation models implementing purely phonological mappings generate phonetic transcriptions that underspecify durational and spectral properties of speech. Reduced variants as predicted by a pronunciation model ought to be phonetically homophonous—e.g., the fast variant of "support" being pronounced as /s/p/o/r/t/ is phonetically homophonous with "sport"). But for to create such homophony, not only should the unstressed vowels be deleted, but the durations of the remaining phones also should take the same values as in words not derived from fast speech vowel reduction. Similarly, fast speech intervocalic voicing in a word like "faces" cannot be precisely represented as /f/ey/z/ih/z/—phonetically homophonous with "phases"—unless both the voice value of the fricative as well as the durational relationship between the stressed vowel and the fricative have changed.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
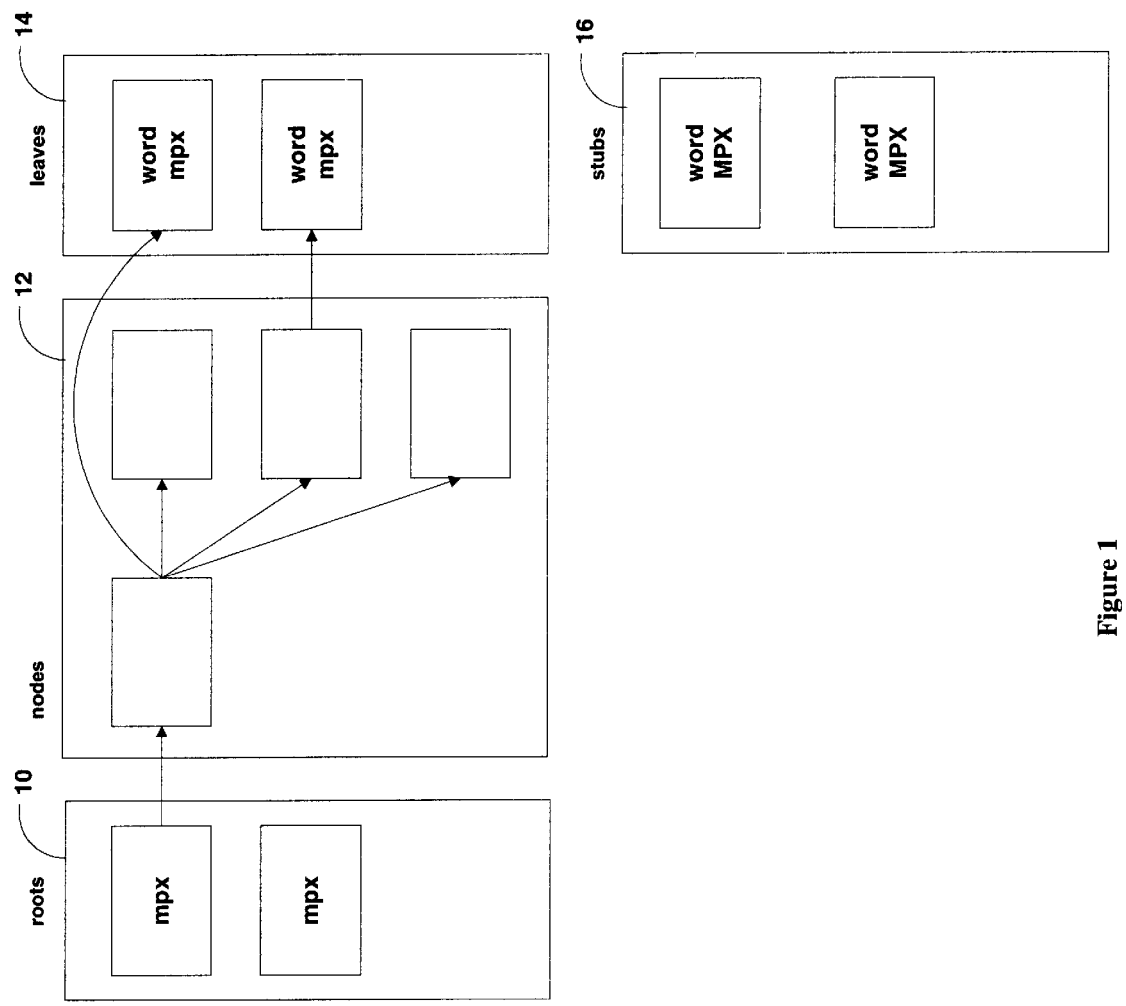
FIG. 1 illustrates a prefix search tree according to a representative embodiment of the present invention showing roots, nodes, leaves, and single phone word nodes (stubs).

The foregoing suggests that capturing the complex variability of conversational speech with purely phone-based speech recognizers is virtually impossible. Embodiments of the present invention generalize phonetic speech transcription to an attribute-based representation that integrates supra-segmental non-phonetic features. A pronunciation model is trained to augment an attribute transcription by marking possible pronunciation effects, which are then taken into account by an acoustic model induction algorithm. A finite state machine single-prefix-tree, one-pass, time-synchronous decoder is used to decode highly spontaneous speech within this new representational framework.

In representative embodiments, the notion of context is broadened from a purely phonetic concept to one based on a set of speech attributes. The set of attributes incorporates various features and predictors such as dialect, gender, articulatory features (e.g. vowel, high, nasal, shifted, stress, reduced), word or syllable position (e.g. word begin/end, syllable boundary), word class (e.g. pause, function word), duration, speaking rate, fundamental frequencies, HMM state (e.g. begin/middle/end state), etc. This approach affects all levels of modeling within the recognition engine, from the way words are represented in the dictionary, through pronunciation modeling and duration modeling, to acoustic modeling. This leads to strategies to efficiently decode conversational speech within the mode dependent modeling framework.

A word is transcribed as a sequence of instances $(\iota_0 \iota_1 \ldots \iota_k)$ which are bundles of instantiated attributes (i.e. attribute-value pairs). Each attribute can be either binary, discrete (i.e. multi-valued), or continuous valued. For example, the filled pause "um" is transcribed by a single instance $\iota$ consisting of truth values for the following binary attributes (pause, nasal, voiced, labial . . . ).

The instance-based representation allows for a more detailed modeling of pronunciation effects as observed in sloppy informal speech. Instead of predicting an expected phonetic surface form based on a purely phonetic context, the canonical instance-based transcription is probabilistically augmented. A pronunciation model predicts instances for the set of attributes. Instead of mapping from one phone sequence to another, the pronunciation model is trained to predict pronunciation effects:

$$p(\iota_k' | \ldots \iota_{k-1} [\iota_k] \iota_{k+1} \ldots )$$

Pronunciation variants are derived by augmenting the initial transcription by the predicted instances:

$$\iota_0 \iota_1 \ldots \iota_k z, 900 \; (\iota_0 \oplus \iota_0')(\iota_1 \oplus \iota_1') \ldots (\iota_k \oplus \iota_k')$$

which are then weighted by a probability:

$$p(l_0' l_1' \ldots l_k') = \frac{1}{Z} \prod_{k=0}^{k} p(l_k' | \ldots l_{k-1}[l_k]l_{k+1} \ldots)$$

where Z is a normalizing constant.

Predicting pronunciation variation, as described above, by augmenting the phonetic transcription by expected pronunciation effects avoids potentially homophonous representation of variants (see, e.g., M. Finke and A. Waibel, *Speaking Mode Dependent Pronunciation Modeling in Large Vocabulary Conversational Speech Recognition*, in Proceedings of Eurospeech-97, September 1997, incorporated. herein by reference).

The original transcription is preserved, and the duration and acoustic model building process exploit the augmented annotation. Decision trees are grown to induce a set of context dependent duration and acoustic models. The induction algorithm allows for questions with respect to all attributes defined in the transcription. Thus, starting from the augmented transcription, context dependent modeling means that the acoustic models derived depend on the phonetic context, pronunciation effects, and speaking mode-related attributes. This leads to a much tighter coupling of pronunciation modeling and acoustic modeling because model induction takes the pronunciation predictors into account as well as acoustic evidence.

For coherence of training, testing, and rescoring results, a corresponding LVCSR decoder should handle finite state grammar decoding, forced alignment of training transcripts, large vocabulary statistical grammar decoding, and lattice rescoring. One typical embodiment uses a single-prefix-tree time-synchronous one-pass decoder that represents the underlying recognition grammar by an abstract finite state machine. To have reasonable efficiency in a one-pass decoder, the dictionary is represented by a pronunciation prefix tree as described in H. Ney, R. Haeb-Umbach, B.-H. Tran, M. Oerder, *"Improvement In Beam Search For 10000-word Continuous Speech Recognition,"* IEEE International Conference on Acoustics, Speech, and Signal Processing, Vol. 1, pp. 9–12, 1992, incorporated herein by reference.

Two problems can result from this representation. First, if the tree is reentrant, then only the single best history may be considered at word transitions at each time t. Second, the application of the grammar score is delayed since the identity of the word is only known at the leaves of the tree. To deal with the first problem, a priority heap may represent alternative linguistic theories in each node of the prefix tree as described in previously cited Alleva, Huang, and Hwang. The heap maintains all contexts whose probabilities are within a certain threshold, thus avoiding following only the single best local history. The threshold and the heap policy have the benefit of allowing different more or less aggressive search techniques by effectively controlling hypothesis merging. In contrast to the tree copying process employed by other recognizers, the heap approach is more dynamic and scalable.

The language model is implemented in the decoder as an abstract finite state machine. The exact nature of the underlying grammar remains transparent to the recognizer. The only means to interact with a respective language model is through the following set of functions in which FSM is a finite state machine-based language model:

FSM.initial( )—Returns the initial state of the FSM.

FSM.arcs(state)—Returns all arcs departing from a given state. An arc consists of the input label (recognized word), the output label, the cost, and the next state. Finite state machines are allowed to be non-deterministic, i.e. there can be multiple arcs with the same input label.

FSM.cost(state)-Returns the exit cost for a given state to signal whether or not a state is a final state.

This abstraction of the language model interface makes merging of linguistic theories a straightforward and well-defined task to the decoder: two theories fall into the same congruence class of histories and can be merged if the state indices match. The finite state machine is designed to return which theories can be merged. One advantage of this division of labor is that the decoder can decode grammars of any order without any additional implementation effort.

To deal with filler words, i.e. words that are not modeled by a particular FSM grammar (these are typically pauses such as silence and noises), the decoder may virtually add a self loop with a given cost term to each grammar state. As a result any number of filler words can be accepted/recognized at each state of the finite state machine.

One typical embodiment provides a set of different instantiations of the finite state machine interfaces that are used in different contexts of training, testing or rescoring a recognizer:

Finite State Grammar Decoding—Of course, the FSM interface may explicitly define a finite state grammar. Besides its use in command-and-control, this application can be used in training the recognizer. In M. Finke and A. Waibel, *Flexible Transcription Alignment*, in ASRU, pages 34—40, Santa Barbara, Calif., December 1997, we showed that, when dealing with unreliable transcripts of training data, a significant gain in word accuracy can be achieved by training from probabilistic transcription graphs instead of the raw transcripts. Typical embodiments allow for decoding of right recursive rule grammars by simulating an underlying heap to deal with recursion. The transcription graphs of the Flexible Transcription Alignment (FTA) paradigm may be expressed in the decoder by a probabilistic rule grammar. Thus, forced alignment of training data is basically done through decoding these utterance grammars.

N-gram Decoding—Statistical n-gram language models are not explicitly represented as a finite state machine. Instead, a finite state machine wrapper is built around n-gram models. The state index codes the history such that FSM.arcs(state) can retrieve all the language model scores required from the underlying n-gram tables. This implies that the FSM is not minimized and the state space is the vocabulary to the power of the order of the n-gram model.

Lattice Rescoring—Lattices are finite state machines, too. So, rescoring a word graph using a different set of acoustic models and a different language model is feasible by decoding along lattices and on-the-fly composition of finite state machines.

Grammar probabilities should be incorporated into the search process as early as possible so that tighter pruning thresholds can be used for decoding. Within the finite state machine abstraction, lookahead techniques can be generalized to any kind of FSM based language model. See, e.g. S. Ortmanns, A. Eiden, H. Ney, and N. Coenen, *Look-Ahead Techniques for Fast Beam Search*, in Proceedings of the ICASSP'97, pages 1783–1786, Munich (Germany), 1997, incorporated herein by reference. For each state, the decoder needs to derive—on demand—a cost tree that reports for each node of the prefix tree what the best language model score is going to be for all words with a given prefix. For a trigram-based FSM, the lookahead tree will thus be a trigram lookahead; for fourgrams, a fourgram lookahead; and for finite state grammars, the lookahead will be a projection of all words allowed at a given grammar state. In order to compute finite state machine lookahead trees efficiently on demand, several techniques can be combined:

Lookahead trees may be saved in an aging cache as they are computed to avoid recomputing the tree in subsequent frames.

The size of the cache and the number of steps to compute the tree can be reduced by precomputing a new data structure from the prefix tree: the cost tree. The cost tree represents the cost structure in a condensed form, and turns the rather expensive recursive procedure of finding the best score in the tree into an iterative algorithm.

Each heap element, hypothesis, or tree copy has the current FSM lookahead score attached. When a hypothesis is expanded to the next node and the corresponding lookahead tree has been removed from the cache, the tree will not be recomputed. Instead, the lookahead probability of the prefix is propagated forward ("lazy cache" evaluation).

Typical embodiments use polyphonic within-word acoustic models, but triphone acoustic models across word boundaries. To incorporate crossword modeling in a single-prefix-tree decoder, the context dependent root and leaf nodes are dealt with. Instead of having context dependent copies of the prefix tree, each root node may be represented as a set of models, one for each possible phonetic context. The hypotheses of these models are merged at the transition to the within word units (fan-in). As a compact means of representing the fan-in of root nodes and the corresponding fan-out of leaf nodes, the notion of a multiplexer was developed. A multiplexer is a dual map that maps instances $\iota$ to the index of a unique hidden Markov model for the context of $\iota$:

$\text{mpx}(\iota): \iota z, 900 \ i \in \{0, 1, \ldots N_{mpx}\}$ $\text{mpx}[i]: iz, 900 \ m \in \{m_0, m_1, \ldots m_{N_{mpx}}\}$ where $m_0, m_1, \ldots m_{n_{mpx}}$ are unique models. The set of multiplexer models can be precomputed based on the acoustic modeling decision tree and the dictionary of the recognizer. FIG. 1 shows the general organization of a multiplexer-based prefix search tree showing various type of nodes including a root node 10, internal node 12, leaf node 14, and single phone word node 16 (also called a stub).

To model conversational speech, multiplexers are particularly useful since the augmented attribute representation of words leads to an explosion in the number of crossword contexts. Because multiplexers map to unique model indices, they basically implement a compression of the fan-in/out and a technique to address the context dependent model by the context instance $\iota$.

Figure 2:
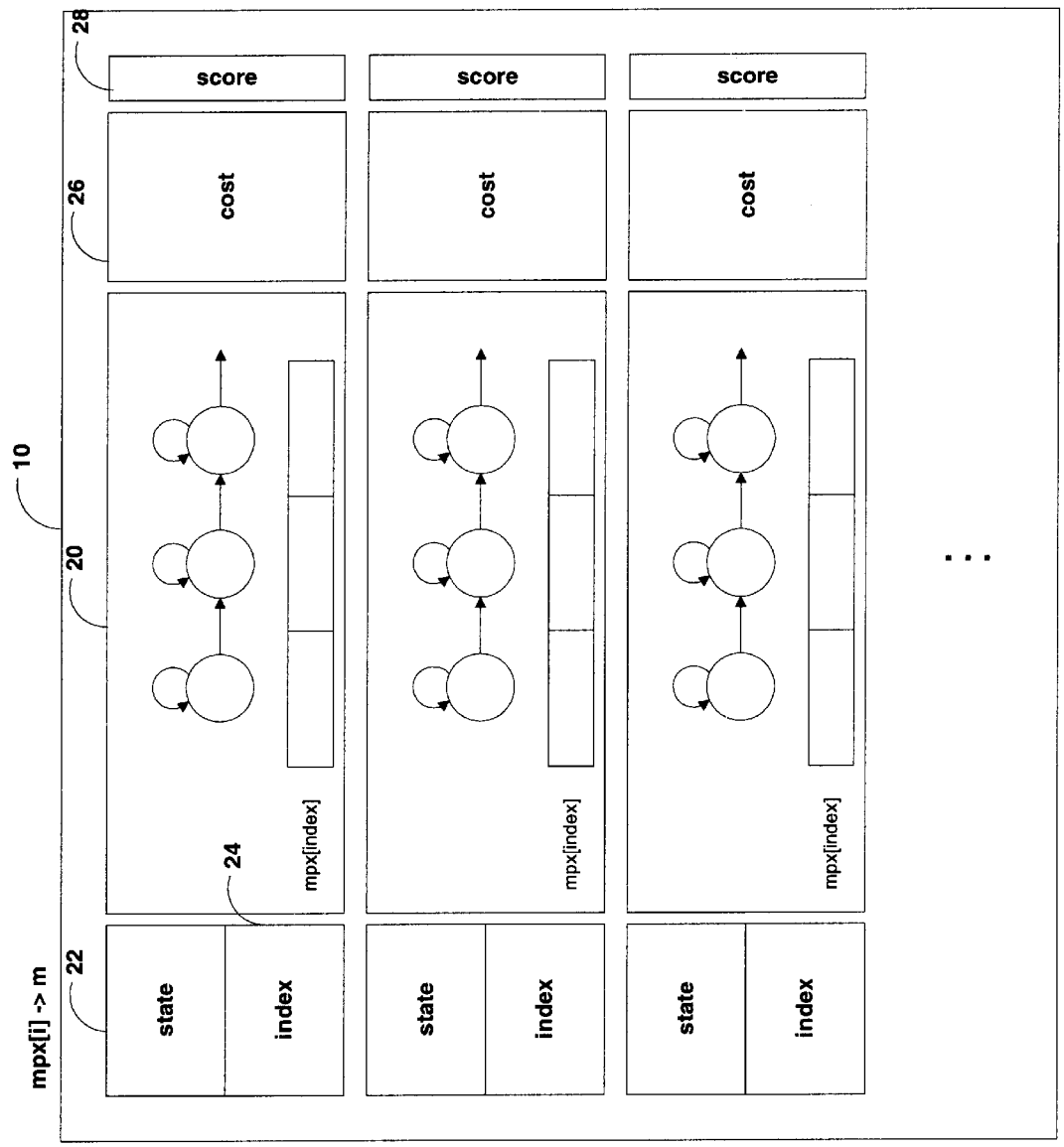
FIG. 2 illustrates the heap structure of a root node.

The heap structure of a root node, 10 in FIG. 1, is shown in FIG. 2. The root node 10 represents the first attribute instance of words in terms of a corresponding multiplexer 20. The structure also includes for each node a finite state machine grammar state 22 and corresponding state index 24. Cost structure 26 contains a finite state machine lookahead score for the node. Score structure 28 contains a total best score of hypotheses, the acoustic score plus expected FSM cost. Heap policy only merges hypotheses that have the same history or linguistic theory, and whose final instances $\iota_a$ and $\iota_b$ map to the same context dependent word initial model: $\text{mpx}(\iota_a)=\text{mpx}(\iota_b)$. This means that the heap is used to keep track of different contexts, the FSM state (representing the linguistic context), as well as acoustic contexts. In word internal nodes 12, only hypotheses found to be in the same FSM state are collapsed.

Figure 3:
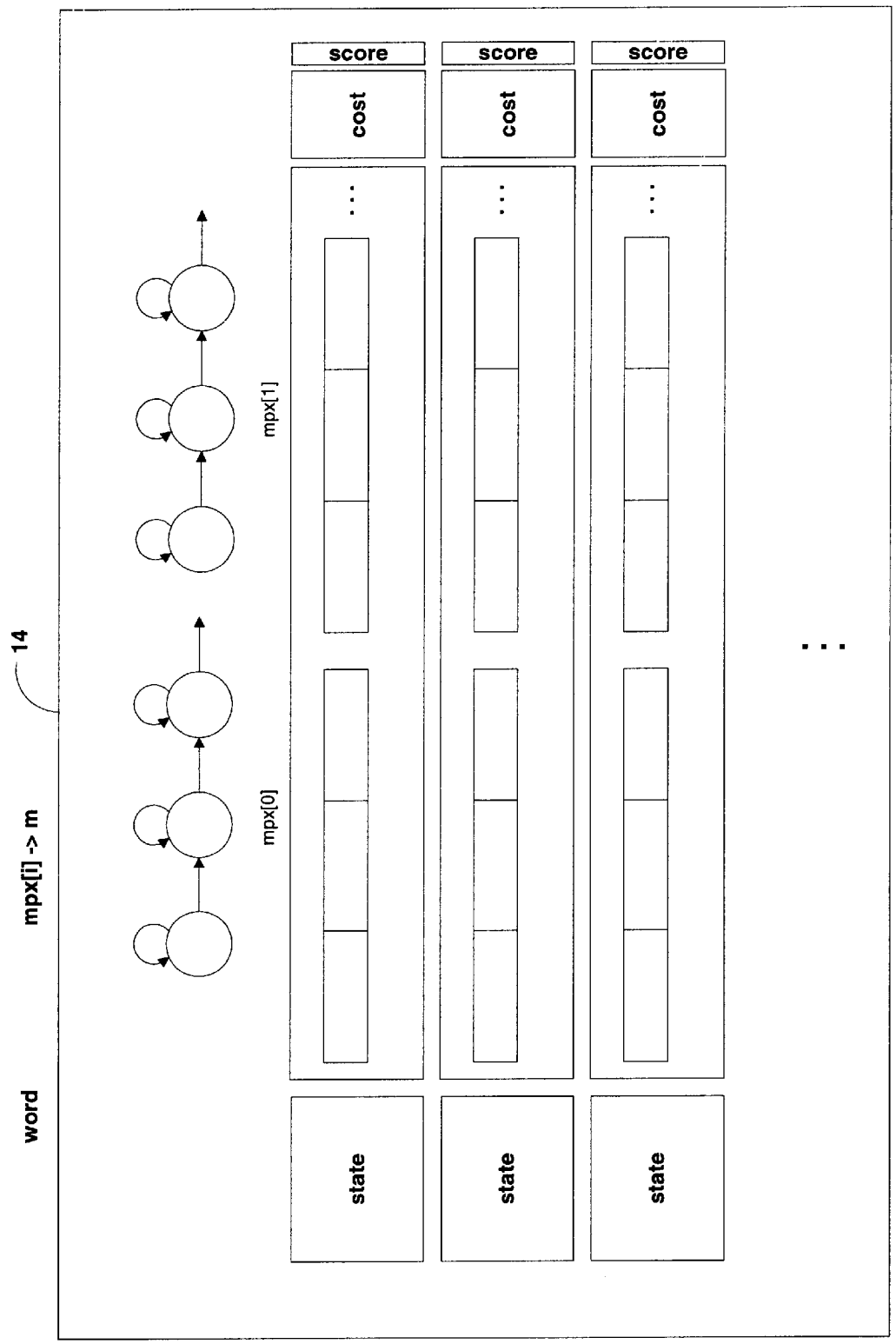
FIG. 3 illustrates the heap structure of a leaf node.

For every word there is a leaf node, 14 in FIG. 1, the heap structure of which is illustrated by FIG. 3. A multiplexer describes the leaf node fan-out, and each heap element represents the complete fan-out for a given grammar state.

Figure 4:
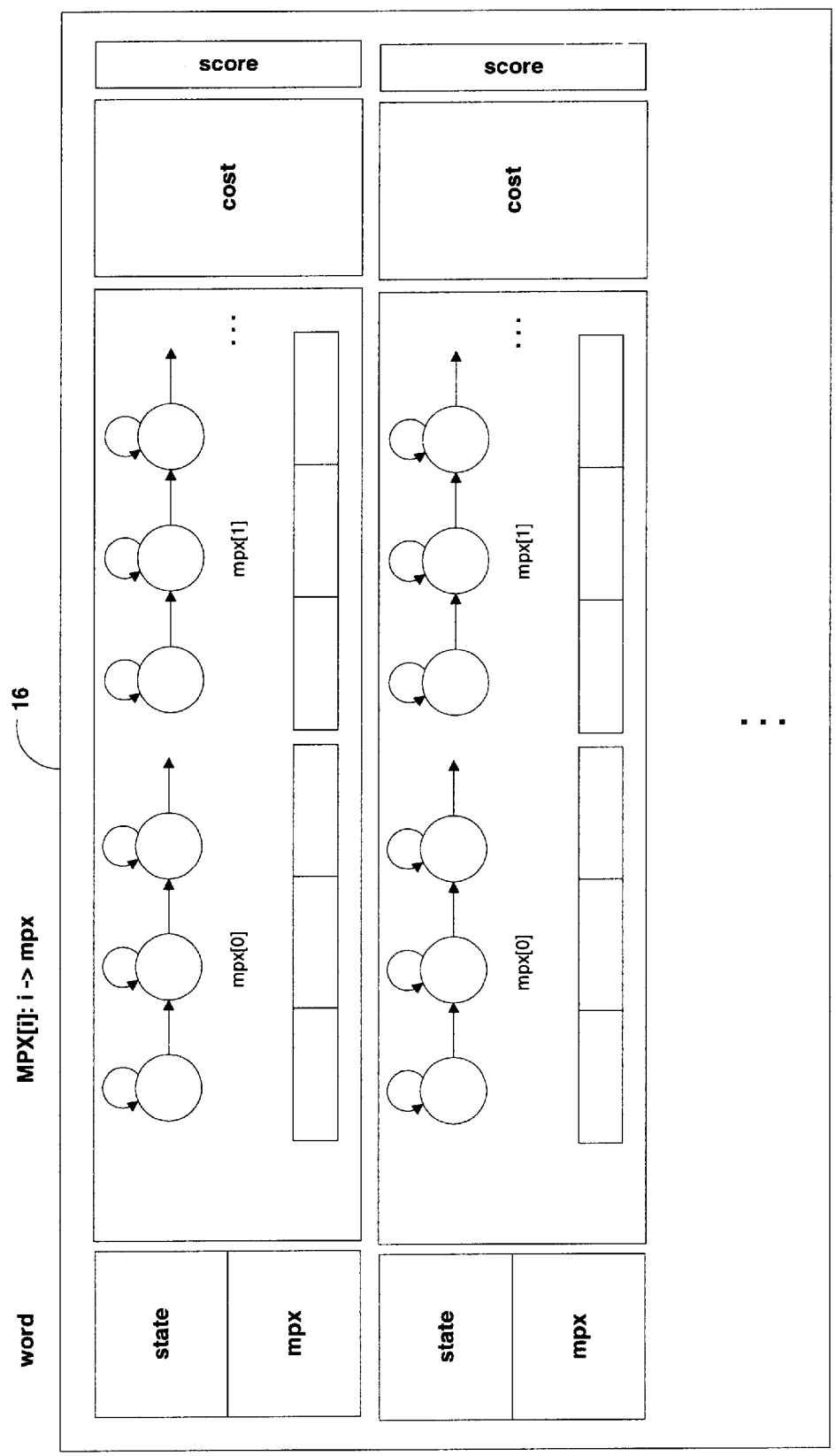
FIG. 4 illustrates the heap structure of a stub.

FIG. 4 illustrates the heap structure for a single-phone instance word node or stub, 16 in FIG. 1. Words consisting of only one phone are represented by a multiplexer of multiplexers. Depending on the left context of the word, this stub multiplexer returns a multiplexer representing the right-context dependent fan-out of this word. The heap policy is the same as for root nodes, and each heap element represents the complete fan-out as for leaf nodes.

In addition to the acoustic and the word end beam for pruning the acoustics, two heap related controls may also be used: (1) the maximum number of heap elements can be bounded, and (2) there can be a beam to prune hypotheses within a heap against each other. The number of finite state machine states expanded at each time t can be constrained as well (topN threshold).

Acoustic model evaluation is sped up by means of gaussian selection through Bucket Box Intersection (BBI) and by Dynamic Frame Skipping (DFS). Thus, acoustic models are reevaluatedonly provided the acoustic vector changed significantly from time t to time t+1. A threshold on the Euclidean distance is defined to trigger reevaluation of the acoustics. To avoid skipping too many consecutive frames, only one skip at a time may be taken—after skipping one frame, the next one must be evaluated.

To assess the performance of a representative embodiment of the decoder under tight realtime constraints, an evaluation test started from a Switchboard recognizer trained on human-to-human telephone speech. The acoustic front end computed 42 dimensional feature vectors consisting of 13 mel-frequency cepstral coefficients plus log power and their first and second derivatives. Cepstral mean and variance normalization as well as vocal tract length normalization were used to compensate for channel and speaker variation. The recognizer consisted of 8000 pentaphonic Gaussian mixture models. A 15k word recognition vocabulary and approximately 30k dictionary variants generated by a mode dependent pronunciation model were used for decoding. Without MLLR adaptation, and decoded with a Switchboard trigram language model trained on 3.5 million words, the base performance at 100×RT was 37% word error rate (run-on, one-pass recognition on NIST Eval'96). Groups participating in recent NIST evaluations reported decoding times in the order of 300 realtime factors (which included multiple adaptation passes).

Table 1 shows the first word accuracy results of our Switchboard recognizer at around ten times realtime. This shows tight pruning in the context of highly confusable Switchboard speech. TopN=10 means that only 10 finite state machine states were expanded per frame. DFS indicates Dynamic Frame Skipping, and BBI indicates Bucket Box Intersection.

TABLE 1

| Condition | RT | WER % |
| --- | --- | --- |
| Baseline | 100 | 37 |
| Tight Beams, topN = 10 | 12 | 43.8 |
| Tight Beams, topN = 10, DFS | 7 | 45.6 |
| Tight Beams, topN = 10, DFS, BBI | 5 | 49.8 |

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. An attribute-based speech recognition system comprising:

A speech pre-processor that receives input speech and produces a sequence of acoustic observations representative of the input speech;

A database of context-dependent acoustic models that characterize a probability of a given sequence of sounds producing the sequence acoustic observations, each acoustic model including phonetic attributes and suprasegmental non-phonetic attributes;

A finite state language model that characterizes a probability of a given sequence of words being spoken; and A one-pass decoder that compares the sequence of acoustic observations to the acoustic models and the language model, and outputs at least one word sequence representative of the input speech.

2. A speech recognition system according to claim 1, wherein the suprasegmental non-phonetic attributes include speaking rate.

3. A speech recognition system according to claim 1, wherein the suprasegmental non-phonetic attributes include phone durations.

4. A speech recognition system according to claim 1, wherein the suprasegmental non-phonetic attributes include dialect.

5. A speech recognition system according to claim 1, wherein the suprasegmental non-phonetic attributes include gender.

6. A speech recognition system according to claim 1, wherein the suprasegmental non-phonetic attributes include fundamental frequencies.

7. A speech recognition system according to claim 1, wherein the suprasegmental non-phonetic attributes include hidden Markov model state.

8. A speech recognition system according to claim 1, wherein the suprasegmental non-phonetic attributes include word class.

9. A speech recognition system according to claim 1, wherein the suprasegmental non-phonetic attributes include articulatory features.

10. A speech recognition system according to claim 9, wherein the articulatory features include stress.

11. A speech recognition system according to claim 1, wherein the suprasegmental non-phonetic attributes possess discrete values.

12. A speech recognition system according to claim 11, wherein the discrete values are binary.

13. A speech recognition system according to claim 1, wherein the suprasegmental non-phonetic attributes possess continuous values.

14. A speech recognition system according to claim 1, wherein the suprasegmental non-phonetic attributes include syllabic structure.

15. A speech recognition system according to claim 1, wherein the suprasegmental non-phonetic attributes include syntactic structure.

16. A speech recognition system according to claim 1, wherein the suprasegmental non-phonetic attributes include semantic structure.

17. A speech recognition system according to claim 1, wherein the decoder further comprises:

A probabilistic pronunciation model that characterizes possible pronunciation effects, Wherein an acoustic model induction algorithm augments the acoustic models with the pronunciation model.

18. A speech recognition system according to claim 1, wherein the decoder is a single-prefix-tree decoder.

19. A speech recognition system according to claim 18, wherein the prefix tree includes nodes and leaves, and for each node and leaf a priority heap represents alternative linguistic theories.

20. A speech recognition system according to claim 19, wherein the heap maintains all contexts within a selected threshold probability.

21. A speech recognition system according to claim 19, wherein lookahead cost trees are used to determine for every node a best language model score for all words with a given prefix.

22. A speech recognition system according to claim 21, wherein lookahead trees are saved in an aging cache to avoid recomputing for subsequent frames.

23. A speech recognition system according to claim 21, wherein each heap element has a current lookahead score attached.

24. A speech recognition system according to claim 19, wherein the decoder further comprises:
A multiplexer to represent fan-in of root nodes and fan-out of leaf nodes.

25. A speech recognition system according to claim 24, wherein the prefix tree includes root nodes to represent a first attribute instance of words for a given multiplexer.

26. A speech recognition system according to claim 24, wherein the prefix tree includes word internal nodes wherein the decoder collapses alternative hypotheses only if the alternative hypotheses are in the same finite machine state.

27. A speech recognition system according to claim 24, wherein each word has a leaf node, and the multiplexer describes the fan-out such that each heap element represents a complete fan-out for a given grammar state.

28. A speech recognition system according to claim 24, wherein a single phone word is represented by a multiplexer of multiplexers that, depending on a left context, returns a multiplexer representing a right context-dependent fan-out of the single phone word.

29. A speech recognition system according td claim 1, wherein the decoder is time synchronous.

30. A speech recognition system according to claim 1, wherein the decoder uses decision trees to induce a set of context-dependent duration and acoustic models.

31. A speech recognition system according to claim 1, wherein the language model uses n-gram models in a finite state machine wrapper.

32. A speech recognition system according to claim 1, wherein the decoder uses finite state recognition lattices that enable rescoring a word graph with alternative word models or language models.

33. A speech recognition system according to claim 1, wherein the decoder uses a bucket box intersection technique.

34. A speech recognition system according to claim 1, wherein the decoder uses a dynamic frame skipping technique.

35. An attribute-based method of speech recognition comprising:
Pre-processing input speech to produce a sequence of acoustic observations representative of the input speech;
Characterizing, with context-dependent acoustic models, a probability of a given sequence of sounds producing the sequence of acoustic observations, each acoustic model including phonetic attributes and suprasegmental non-phonetic attributes;
Characterizing, with a finite state language model, a probability of a given sequence of words being spoken; and
Comparing, with a one-pass decoder, the sequence of acoustic observations to the acoustic models and the language model, and outputs at least one word sequence representative of the input speech.

36. A method according to claim 35, wherein the suprasegmental non-phonetic attributes include speaking rate.

37. A method according to claim 35, wherein the suprasegmental non-phonetic attributes include phone durations.

38. A method according to claim 35, wherein the suprasegmental non-phonetic attributes include dialect.

39. A method according to claim 35, wherein the suprasegmental non-phonetic attributes include gender.

40. A method according to claim 35, wherein the suprasegmental non-phonetic attributes include fundamental frequencies.

41. A method according to claim 35, wherein the suprasegmental non-phonetic attributes include hidden Markov model state.

42. A method according to claim 35, wherein the suprasegmental non-phonetic attributes include word class.

43. A method according to claim 35, wherein the suprasegmental non-phonetic attributes include articulatory features.

44. A method according to claim 43, wherein the articulatory features include stress.

45. A method according to claim 35, wherein the suprasegmental non-phonetic attributes possess discrete values.

46. A method according to claim 45, wherein the discrete values are binary.

47. A method according to claim 35, wherein the suprasegmental non-phonetic attributes possess continuous values.

48. A method according to claim 35, wherein the suprasegmental non-phonetic attributes include syllabic structure.

49. A method according to claim 35, wherein the suprasegmental non-phonetic attributes include syntactic structure.

50. A method according to claim 35, wherein the suprasegmental non-phonetic attributes include semantic structure.

51. A method according to claim 35, wherein the comparing further comprises:
Characterizing, with a probabilistic pronunciation model, possible pronunciation effects, and
Augmenting the acoustic models with the pronunciation model using an acoustic model induction algorithm.

52. A method according to claim 35, wherein the comparing uses a single-prefix-tree decoder.

53. A method according to claim 52, wherein the prefix tree includes nodes and leaves, and for each node and leaf a priority heap represents alternative linguistic theories.

54. A method according to claim 53, wherein the priority heap maintains all contexts within a selected threshold probability.

55. A speech recognition system according to claim 53, wherein lookahead cost trees are used to determine for every node a best language model score for all words with a given prefix.

56. A method according to claim 55, wherein lookahead cost trees are saved in an aging cache to avoid recomputing for subsequent frames.

57. A speech recognition system according to claim 55, wherein each heap element has a current lookahead score attached.

58. A method according to claim 53, wherein the comparing further includes representing, with a multiplexer, fan-in of root nodes and fan-out of leaf nodes.

59. A method according to claim 58, wherein the prefix tree includes root nodes to represent a first attribute instance of words for a given multiplexer.

60. A method according to claim 58, wherein the prefix tree includes word internal nodes in which the decoder collapses alternative hypotheses only if the alternative hypotheses are in the same finite machine state.

61. A method according to claim 58, wherein each word has a leaf node and the multiplexer describes the fan-out such that each heap element represents a complete fan-out for a given grammar state.

62. A method according to claim 58, wherein a single phone word is represented by a multiplexer of multiplexers that, depending on a left context, returns a multiplexer representing a right context-dependent fan-out of the single phone word.

63. A method according to claim 35, wherein the comparing includes using a time synchronous decoder.

64. A method according to claim 35, wherein the comparing includes using decision trees to induce a set of context-dependent duration and acoustic models.

65. A method according to claim 35, wherein the language model uses n-gram models in a finite state machine wrapper.

66. A method according to claim 35, wherein the comparing includes using finite state recognition lattices that enable rescoring a word graph with alternative word models or language models.

67. A method according to claim 35, wherein the comparing includes using a bucket box intersection technique.

68. A method according to claim 35, wherein the comparing includes using a dynamic frame skipping technique.

* * * * *

UNITED STATES PATENT AND TRADEMARK OFFICE
CERTIFICATE OF CORRECTION

| | | |
|---|---|---|
| PATENT NO. | : 6,963,837 B1 | Page 1 of 1 |
| APPLICATION NO. | : 09/680925 | |
| DATED | : November 8, 2005 | |
| INVENTOR(S) | : Michael Finke et al. | |

It is certified that error appears in the above-identified patent and that said Letters Patent is hereby corrected as shown below:

Title Page, Item (75) Inventors:

The spelling of the inventor currently listed as "Detleff Koll" should be changed to --Detlef Koll.--

Signed and Sealed this

First Day of May, 2007

JON W. DUDAS
*Director of the United States Patent and Trademark Office*